(12) United States Patent
Zenitani et al.

(10) Patent No.: US 11,192,592 B2
(45) Date of Patent: Dec. 7, 2021

(54) UPPER VEHICLE-BODY STRUCTURE

(71) Applicant: Mazda Motor Corporation, Hiroshima (JP)

(72) Inventors: Tsuneaki Zenitani, Hiroshima (JP); Makoto Morimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/822,053

(22) Filed: Mar. 18, 2020

(65) Prior Publication Data
US 2020/0385065 A1    Dec. 10, 2020

(30) Foreign Application Priority Data

Jun. 5, 2019 (JP) .............................. JP2019-105578

(51) Int. Cl.
| | |
|---|---|
| *B62D 25/06* | (2006.01) |
| *B62D 27/02* | (2006.01) |
| *B62D 25/02* | (2006.01) |
| *B62D 25/08* | (2006.01) |

(52) U.S. Cl.
CPC ........... *B62D 25/06* (2013.01); *B62D 25/025* (2013.01); *B62D 25/088* (2013.01); *B62D 27/023* (2013.01)

(58) Field of Classification Search
CPC ........ B62D 25/02; B62D 25/06; B62D 27/00; B62D 27/02; B62D 27/023
USPC ................... 296/203.01, 203.03, 210, 29, 30
See application file for complete search history.

(56) References Cited

U.S. PATENT DOCUMENTS

| | | | | |
|---|---|---|---|---|
| 2,122,444 | A * | 7/1938 | Tjaarda .................. | B62D 23/00 296/203.01 |
| 3,408,779 | A * | 11/1968 | Allen ..................... | B61D 17/12 52/53 |
| 3,823,518 | A * | 7/1974 | Allen ..................... | B61D 17/12 52/53 |
| 6,073,992 | A * | 6/2000 | Yamauchi .............. | B62D 23/00 296/203.01 |
| 9,126,602 | B2 * | 9/2015 | Bigras .................... | B61D 17/12 |
| 2004/0080188 | A1 * | 4/2004 | Igarashi ................. | B62D 23/00 296/203.04 |
| 2009/0033127 | A1 * | 2/2009 | Duerr .................... | B62D 21/02 296/203.01 |
| 2010/0173126 | A1 * | 7/2010 | Malek .................... | C08L 77/02 428/138 |
| 2018/0201325 | A1 * | 7/2018 | Arora .................... | B62D 25/06 |

FOREIGN PATENT DOCUMENTS

JP         2003-112656 A      4/2003

\* cited by examiner

*Primary Examiner* — Dennis H Pedder
(74) *Attorney, Agent, or Firm* — Xsensus LLP

(57) ABSTRACT

An upper vehicle-body structure includes a roof reinforcement having a width in a vehicle front-rear direction to serve as a bridge between a pair of roof side rails in a vehicle width direction and a reinforcement member on the roof reinforcement and diagonally extending in the vehicle front-rear direction. The brace is joined to the roof reinforcement at positions at which a front end portion and a rear end portion of the brace in the vehicle front-rear direction are offset from each other in the vehicle width direction.

19 Claims, 8 Drawing Sheets

UPPER VEHICLE-BODY STRUCTURE

CROSS-REFERENCE TO RELATED APPLICATION

The present application claims priority to JP 2019-105578, filed Jun. 5, 2019, the entire contents of which are incorporated herein by reference.

BACKGROUND

Field

Embodiments relate to an upper vehicle-body structure in which a pair of roof side rails extending along the vehicle front-rear direction on both of left and right sides of an upper portion of a vehicle body in the vehicle width direction is provided, and a roof reinforcement having a width in the vehicle front-rear direction and serving as a bridge between the pair of roof side rails in the vehicle width direction is provided.

Description of the Related Art

Hitherto, roof side rails extending in the vehicle front-rear direction on both of left and right sides of the upper portion of the vehicle body in the vehicle width direction has been provided. A roof reinforcement serving as a bridge between the roof side rails in the vehicle width direction is often provided in order to improve the rigidity of the vehicle body and in preparation for cases where load is input from above the vehicle or the vehicle rolls over in the event of an accident.

Rigidity of the vehicle body may be improved by providing a bridge between a pair of left and right roof side rails in the vehicle width direction by a roof reinforcement, e.g., a cross beam, having a closed cross-section structure.

However, the viewpoint of improving fuel efficiency and improving the motion performance of the vehicle, weight saving of the vehicle body is desired, and there is a demand for realizing the reinforcement of the vehicle body with a lighter-weight structure. Weight increases due to the roof reinforcement having a closed cross-section structure being provided over the entire width in the vehicle width direction.

The roof reinforcement itself may exhibit a twisting behavior in accordance with the behavior difference between the left side and the right side of the vehicle when the vehicle travels depending on the structure (for example, a structure of a vehicle having a relatively large door opening portion without a center pillar) of the vehicle body. In particular, when the vehicle corners, the roof reinforcement is twisted due to the loads input to the left side and the right side of the roof reinforcement being different.

SUMMARY

An upper vehicle-body structure according to the one or more embodiments includes a roof reinforcement having a width in a vehicle front-rear direction to serve as a bridge between the pair of roof side rails in the vehicle width direction and a brace on the roof reinforcement and diagonally extending in the vehicle front-rear direction. The brace may be joined to the roof reinforcement at positions at which a front end portion and a rear end portion of the brace in the vehicle front-rear direction are offset in the vehicle width direction.

With this configuration, the reinforcement member diagonally extending in the vehicle front-rear direction is joined to the roof reinforcement, and hence the twisting behavior of the roof reinforcement that occurs when the vehicle travels can be suppressed while saving weight.

In one embodiment, the brace is an elongated member. With this configuration, weight can be saved as compared to a structure in which the entire upper portion of the roof reinforcement is covered with one rectangular plate.

In one embodiment, the brace includes a plurality of reinforcement members, and the plurality of reinforcement members form a substantially X shape in plan view. With this configuration, the twisting prevention effect of the roof reinforcement can be increased.

In one embodiment, a door opening portion without a center pillar is in a vehicle side portion by each of the roof side rails on which the roof reinforcement is provided. With this configuration, the following advantageous effect is exhibited. When the door opening portion without a center pillar is in the vehicle side portion, the twisting behavior easily occurs for the roof reinforcement due to the absence of a center pillar, but the twisting behavior of the roof reinforcement can be suppressed by the brace.

In one embodiment, a structure body extending in a substantially up-down direction of a vehicle is provided on a rear portion of the door opening portion, and a rear suspension member of the vehicle is provided near a lower end portion of the structure body. The rear suspension member may be set to be a trailing arm of a torsion beam type rear suspension or other types of rear suspension members.

With this configuration, the following advantageous effect is exhibited. The load input from the rear suspension member of the vehicle to the structure body extending in a substantially up-down direction via a place near the lower end portion of the structure body is transmitted to the roof reinforcement via the roof side rails, but the twisting behavior of the roof reinforcement can be suppressed by the brace.

DETAILED DESCRIPTION OF THE PREFERRED EMBODIMENTS

Figure 1:
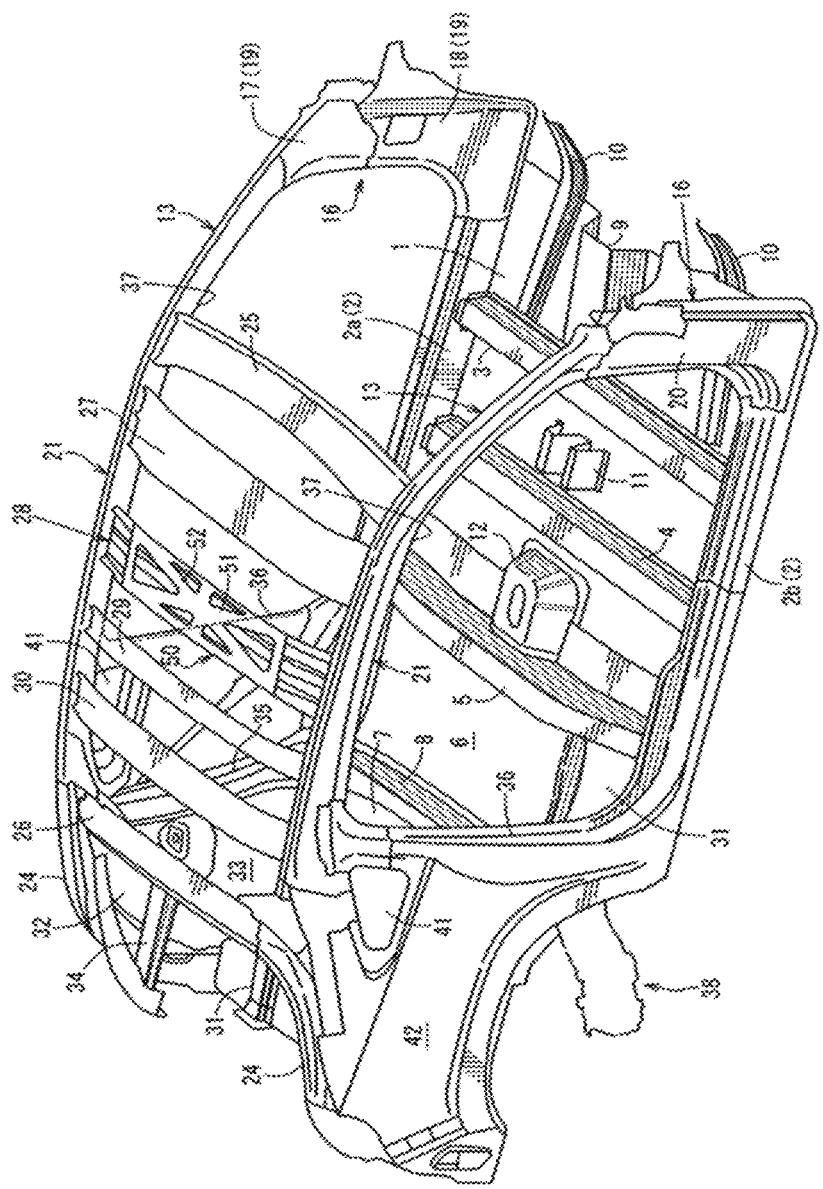
FIG. 1 is a perspective view illustrating a vehicle-body structure of an entire vehicle including an upper vehicle-body structure.

As discussed in detail below, embodiments may suppress the twisting behavior of a roof reinforcement that occurs when a vehicle travels while saving weight. In accordance with one or more embodiments, an upper vehicle-body structure may include a pair of roof side rails extending along a vehicle front-rear direction on both of left and right sides of an upper portion of a vehicle body in a vehicle width direction, a roof reinforcement having a width in the vehicle front-rear direction and serving as a bridge between the pair of roof side rails in the vehicle width direction, and a reinforcement member provided on the roof reinforcement and diagonally extending in the vehicle front-rear direction. The reinforcement member may be joined to the roof reinforcement at positions at which a front end portion and a rear end portion of the reinforcement member in the vehicle front-rear direction offset each other in the vehicle width direction.

Embodiments are described in detail below with reference to the accompanying drawings. In the drawings, arrow F indicates the vehicle front side, arrow R indicates the vehicle rear side, and arrow UP indicates the vehicle upper side.

Figure 2:
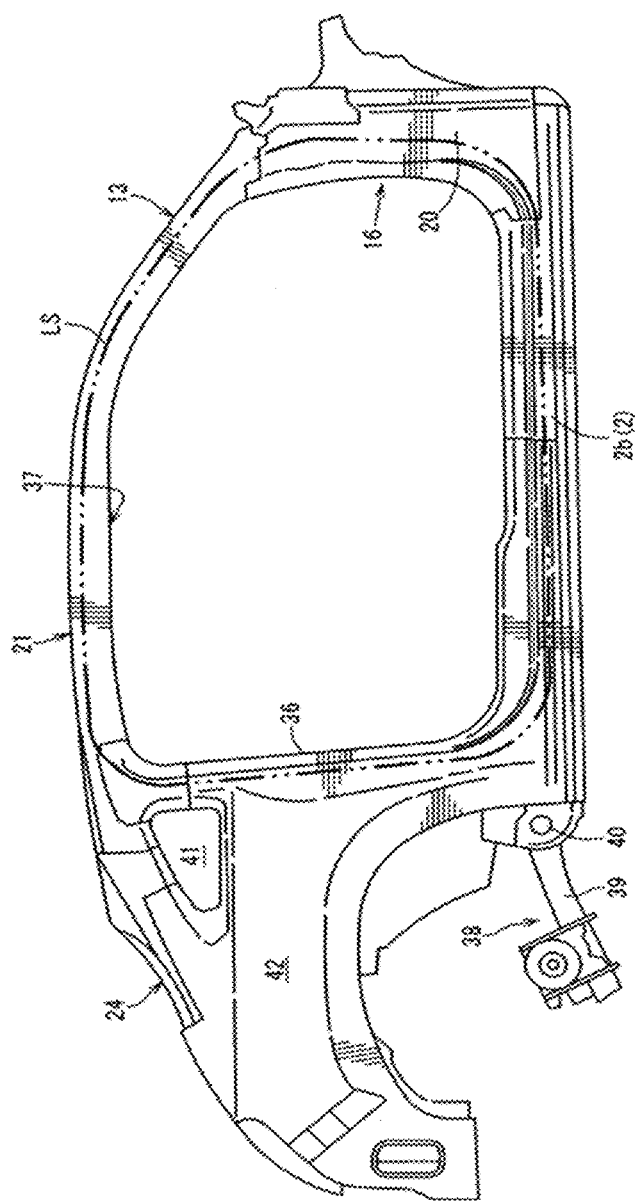
FIG. 2 is a side view of the right side of the vehicle in FIG. 1.
Figure 3:
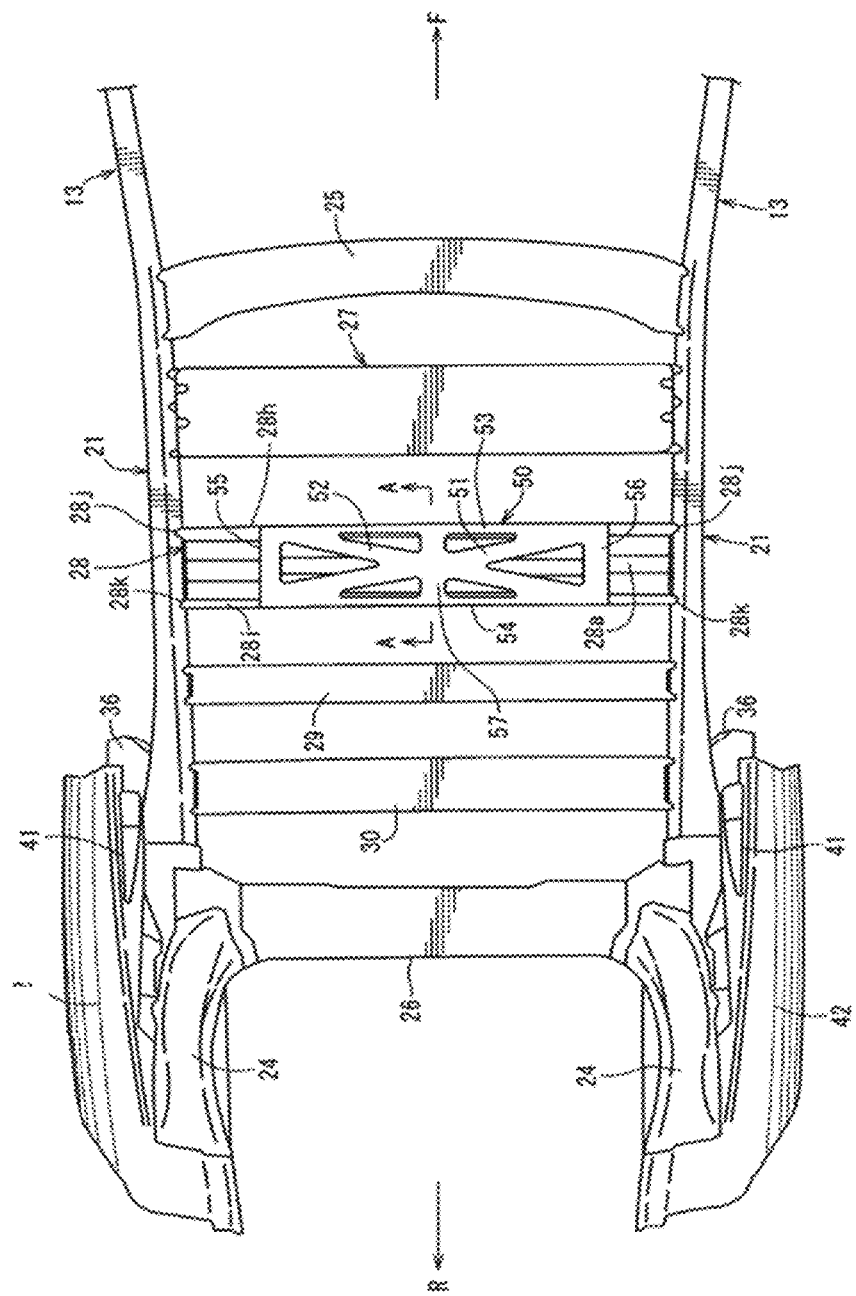
FIG. 3 is a plan view illustrating the upper vehicle-body structure.
Figure 4:
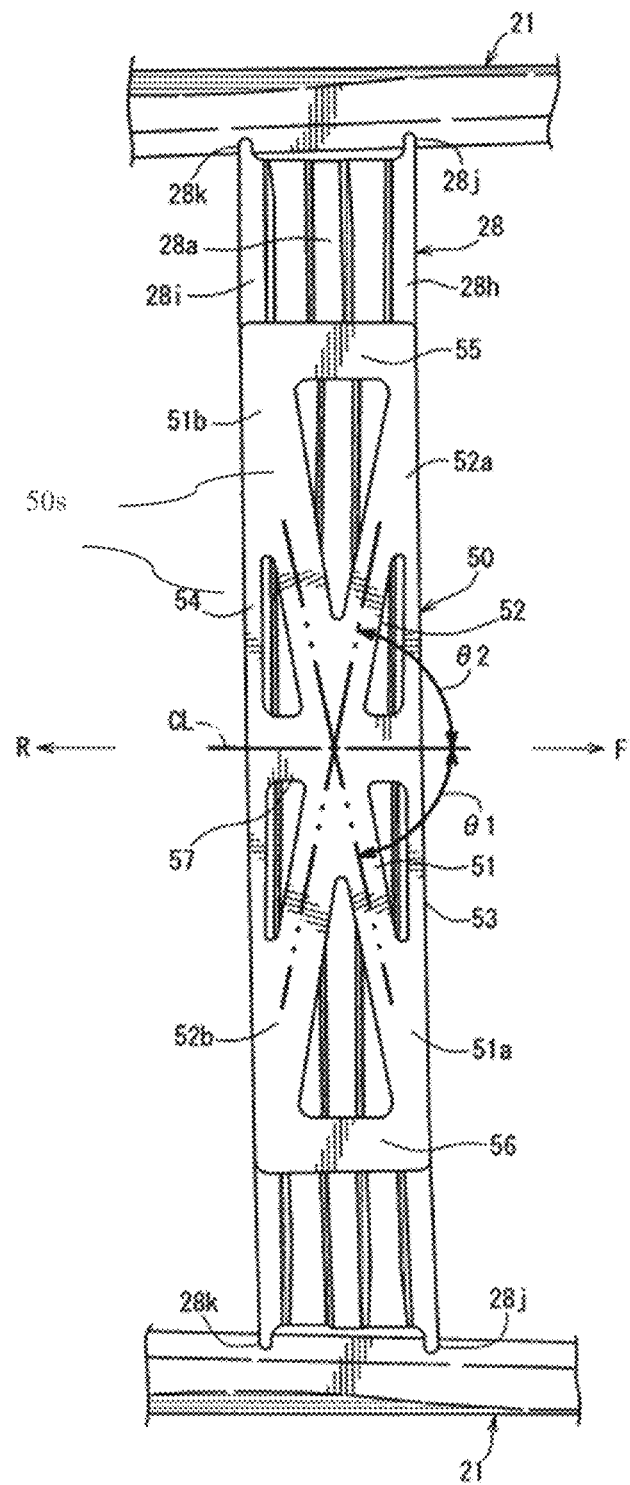
FIG. 4 is an enlarged plan view of a main portion shown in FIG. 3.
Figure 5:
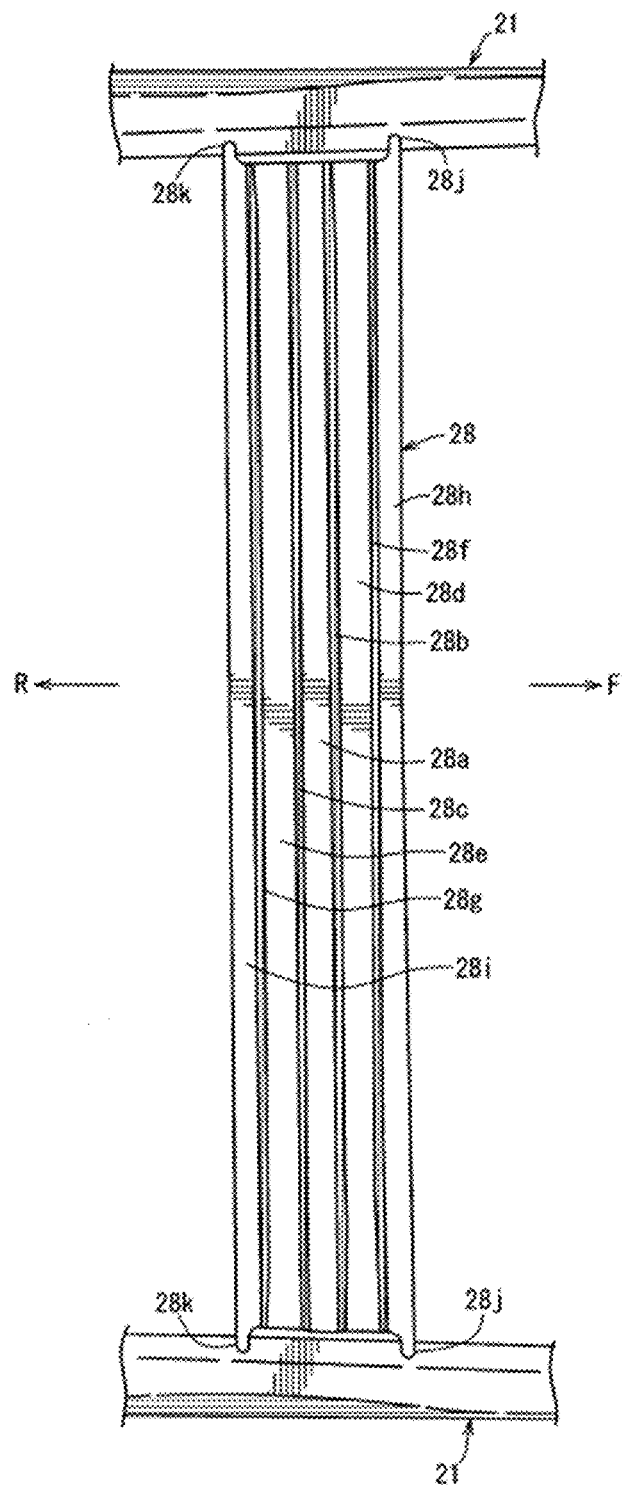
FIG. 5 is an enlarged plan view of the main portion illustrated in a state in which a reinforcement member is removed from FIG. 3.
Figure 6:
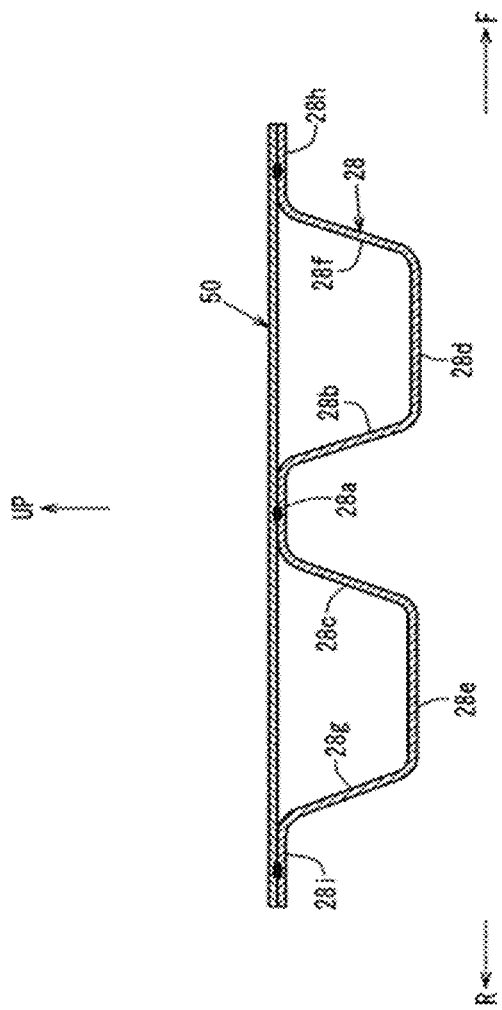
FIG. 6 is a cross-sectional view taken along line A-A from arrows in FIG. 3.
Figure 7:
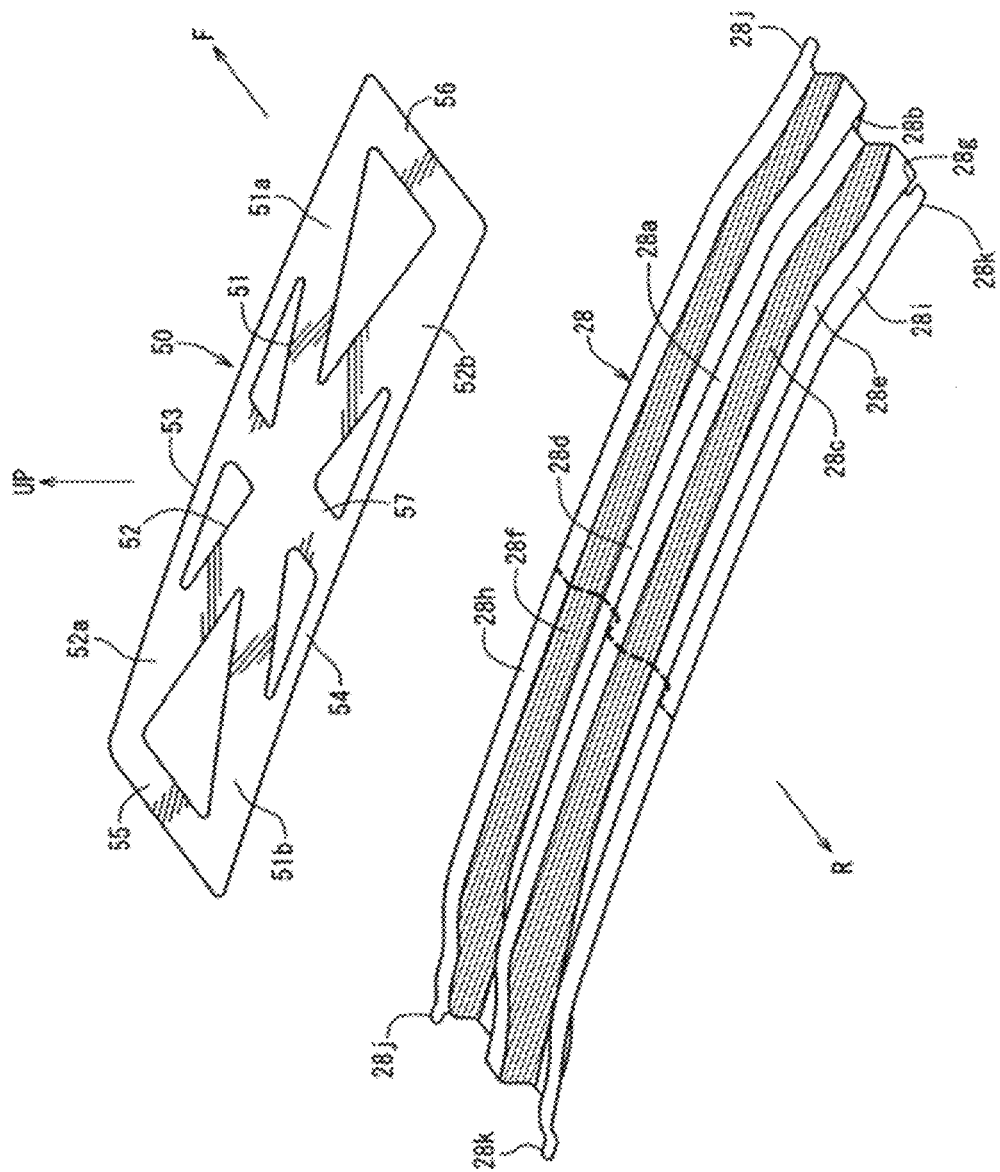
FIG. 7 is an exploded perspective view of a roof reinforcement and the reinforcement member.

The drawings illustrate the upper vehicle-body structure. FIG. 1 is a perspective view illustrating a vehicle-body structure of an entire vehicle including the upper vehicle-body structure. FIG. 2 is a side view of the right side of the vehicle in FIG. 1. FIG. 3 is a plan view illustrating the upper vehicle-body structure. FIG. 4 is an enlarged plan view of a main portion shown in FIG. 3. FIG. 5 is an enlarged plan view of the main portion illustrated in a state in which a reinforcement member is removed from FIG. 3. FIG. 6 is a cross-sectional view taken along line A-A from arrows in FIG. 3. FIG. 7 is an exploded perspective view of a roof reinforcement and the reinforcement member. FIG. 8(a) to FIG. 8(d) are plan views illustrating other embodiments of the reinforcement member.

Note that a vehicle-body structure of an electric automobile that does not include an internal-combustion engine such as an engine for vehicle traveling, an exhaust pathway including an exhaust pipe, and a center tunnel portion that extends so as to be long in the vehicle front-rear direction is exemplified in the embodiments below, but embodiments are not limited to the upper vehicle-body structure of the electric automobile.

First, the vehicle-body structure of the entire vehicle is described with reference to FIG. 1, FIG. 2, and FIG. 3.

As illustrated in FIG. 1, a dash panel (in detail, a dash lower panel) that separates a motor room of the vehicle front portion and a vehicle interior behind the motor room in the vehicle front-rear direction is provided, and a substantially flat-shaped front floor panel 1 (hereinafter simply referred to as the "front floor panel 1") is disposed on a lower rear-end portion of the dash panel in a continuous manner.

The floor panel 1 forms a floor surface of the vehicle interior, and side sills 2 each having a closed cross-section structure that extend in the vehicle front-rear direction are provided on both of left and right sides of the floor panel 1 in the vehicle width direction. The side sills 2 are vehicle body strength members each having a side sill closed cross-section portion extending in the vehicle front-rear direction obtained by fixing a side sill inner portion 2a and a side sill outer portion 2b to each other by joining.

A front-portion cross member 3 (so-called No. 2 cross member) that linearly couples front portions of the pair of left and right side sills 2, 2 to each other in the vehicle width direction is provided. The front-portion cross member 3 is formed by a member having a hat-shaped cross section, and a closed cross-section portion linearly extending in the vehicle width direction is formed between the floor panel 1 and the front-portion cross member 3 by fixing the lower flange of the member to the upper surface of the floor panel 1 by joining. The front-portion cross member 3 is provided in a position corresponding to the lower portion of the front side of a front seat.

On the rear side of the front-portion cross member 3, an intermediate cross member 4 (so-called No. 2.5 cross member) that linearly couples intermediate portions of the pair of left and right side sills 2 in the vehicle front-rear direction to each other in the vehicle width direction is provided. The intermediate cross member 4 is also formed by a member having a hat-shaped cross section, and a closed cross-section portion linearly extending in the vehicle width direction is formed between the floor panel 1 and the intermediate cross member 4 by fixing a lower flange of the member to the upper surface of the floor panel 1 by joining. The intermediate cross member 4 is provided in a position corresponding to the lower portion of the rear side of the front seat.

The intermediate cross member 4 and the front-portion cross member 3 are parallel to each other.

A kick-up portion 5 that rises upward and then extends rearward from an upper end thereof is rearward from the intermediate cross member 4. On a lower-side portion of the kick-up portion 5, a cross member (so-called No. 3 cross member) extending in the vehicle width direction is provided. A closed cross-section portion extending in the vehicle width direction is between the cross member and the kick-up portion 5.

A rear seat panel 6 for mounting the rear seat is provided on the rear side of the kick-up portion 5. Further, a rear floor panel 7 that forms a floor surface of a trunk is on the rear side of the rear seat panel 6 in a continuous manner. In the intermediate portion of the rear floor panel 7 in the vehicle width direction, a trunk recessed portion is formed.

A rear-portion cross member 8 (so-called No. 4 cross member) extends in the vehicle width direction across a rear end portion of the rear seat panel 6 and a front end portion of the rear floor panel 7. A closed cross-section portion extending in the vehicle width direction is formed between the rear-portion cross member 8 and each of the rear seat panel 6 and the rear floor panel 7. In detail, the rear-portion cross member 8 includes a rear-portion cross member upper portion, a rear-portion cross member lower portion, and a closed cross-section portion extending in the vehicle width direction between the rear-portion cross member upper portion and the rear-portion cross member lower portion.

Meanwhile, as illustrated in FIG. 1, a partial tunnel portion 9 that protrudes into the vehicle interior is integrally formed or formed in an integral manner in the center of the front portion of the floor panel 1 in the vehicle width direction. The tunnel portion 9 is a partial portion only between the rear end of the lower portion of the dash panel and a portion immediately before the front-portion cross member 3.

As illustrated in the same figure, a floor frame 10 (in detail, a floor frame upper portion) is fixed to the intermediate portion between the tunnel portion 9, located in a central portion in the vehicle width direction, and the side sill 2, located in a side portion in the vehicle width direction, in the vehicle width direction by joining. The floor frame 10 has a hat cross-sectional shape, and a closed cross-section portion extending in the vehicle front-rear direction is between the floor frame 10 and each of the floor panel 1 and the lower portion of the dash panel by joining a lower flange of the floor frame 10 across the floor panel 1 and the lower portion of the dash panel.

As illustrated in FIG. 1, a bracket 11 protrudes in a substantially M-shaped in front view of the vehicle in an intermediate portion between the front-portion cross member 3 and the intermediate cross member 4 in the vehicle front-rear direction and in a central position in the vehicle width direction.

As illustrated in FIG. 1, a kick-up portion reinforcement member 12 having an upper wall, left and right side walls, and a front wall is on a central portion immediately before the kick-up portion 5 in the vehicle width direction and reinforces the kick-up portion 5 by fixing a lower flange of the kick-up portion reinforcement member 12 to the floor panel 1 and the kick-up portion 5.

As illustrated in FIG. 1 and FIG. 3, front pillar portions 13, each having a closed cross-section structure, are located on portions on both of left and right sides of a front windshield (so-called front window glass) in the vehicle width direction and extend from front end portions of roof side rails 21 described below in a forwardly descending form.

The front pillar portion 13 is a vehicle body strength member having a front pillar closed cross-section portion along the longitudinal direction thereof obtained by fixing a front pillar outer portion and a front pillar inner portion to each other by joining.

Hinge pillar portions 16 each having a closed cross-section structure that extend downward from the front end portions of the pair of left and right front pillar portions 13, 13 to support the door hinge members are provided. Each of the hinge pillar portions 16 is a vehicle body strength member extending in the vehicle up-down direction obtained by fixing a hinge pillar inner portion 19 horizontally divided into a hinge pillar upper-inner portion 17 and a hinge pillar lower-inner portion 18, and a hinge pillar outer portion 20 to each other. A hinge pillar closed cross-section portion extending in the vehicle up-down direction is between the hinge pillar inner portion 19 and the hinge pillar outer portion 20. The hinge pillar portion 16 is a vehicle body strength member that couples a front end of the side sill 2 and an inclined lower end portion of the front pillar portion 13 to each other in the up-down direction.

As illustrated in FIG. 1 and FIG. 3, a pair of left and right roof side rails 21, 21 is provided. The pair of left and right roof side rails 21, 21 is continuous from the front pillar portions 13 to the vehicle rear side, extends in the vehicle front-rear direction more horizontally than the front pillar portions 13, and has an upper portion to which a roof panel is joined. In other words, the roof side rails 21 are vehicle body strength members extending along the vehicle front-rear direction on both of left and right sides of the upper portion of the vehicle body in the vehicle width direction, and each of the roof side rails 21 is a vehicle body strength member that is obtained by fixing a roof side rail inner portion and a roof side rail outer portion to each other, and form a roof side rail closed cross-section portion extending in the vehicle front-rear direction.

As illustrated in FIG. 1 and FIG. 3, rear pillar portions 24 each having a closed cross-section structure that are continuous from the roof side rail 21 to the vehicle rear side and extend to the rear side while curving in a front-high rear-low shape are provided. Each of the rear pillar portions 24 is a vehicle body strength member in which a rear pillar closed cross-section portion along the longitudinal direction of the rear pillar portion 24 is formed by fixing a rear pillar inner portion and a rear pillar outer portion to each other.

As illustrated in FIG. 1 and FIG. 3, a front header 25 extends in the vehicle width direction between front end portions of the roof side rails 21 and has both of left and right end portions thereof fixed to the roof side rails 21. The front header 25 may be curved protruding forward at a center thereof. As illustrated in FIG. 1 and FIG. 3, a rear header 26 extends in the vehicle width direction between upper end portions of the rear pillar portions 24 and has both of left and right end portions thereof fixed to the rear pillar portions 24. The rear header 26 may be substantially linear having an indent in a central portion thereof on a forward facing side.

As illustrated in FIG. 1 and FIG. 3, a plurality of roof reinforcements 27, 28, 29, and 30 spaced apart from each other in the vehicle front-rear direction are provided between the front header 25 and the rear header 26. The roof reinforcements 27 to 30 extend in the vehicle width direction between the pair of left and right roof side rails 21, 21, and each have both of left and right end portions thereof fixed to the roof side rails 21. The roof reinforcements 27 to 30 are reinforcements each having a width (front-rear width) in the vehicle front-rear direction and bridging the pair of left and right roof side rails 21, 21 in the vehicle width direction.

Note that a roof panel (not shown) is provided above the pair of left and right roof side rails 21, the front header 25, the rear header 26, and the roof reinforcements 27 to 30.

As illustrated in FIG. 1, rear side frames 31 each having a closed cross-section structure that extend in the vehicle front-rear direction are provided on both sides of the rear floor panel 7 in the vehicle width direction, and front end portions of the rear side frames 31 extend frontward to positions that overlap with rear end portions of the side sills 2.

A side panel inner portion 32 and a rear wheel well 33 are on the outer side of each of the rear side frames 31 in the vehicle width direction. A gusset member 34 couples a damper support portion on the upper end portion of the rear wheel well 33 and the rear pillar portion 24 in the vehicle front-rear direction in a substantially horizontal form.

As illustrated in FIG. 1, a brace member 35 is continuous from an end portion of the rear cross member 8 in the vehicle width direction to the upper side of the vehicle. The brace member 35 is fixed to the inner surface of the rear wheel well 33 and the side panel inner portion 32. A closed cross-section portion extending in the vehicle up-down direction is formed between the brace member 35 and each of the side panel inner portion 32 and the rear wheel well 33.

As illustrated in FIG. 1, structure bodies 36 each have a closed cross sectional shape. Each of the structure bodies 36 couples the rear portion of the roof side rail 21 corresponding to the roof reinforcement 30 located on the rearmost side of the vehicle out of the plurality of roof reinforcements 27 to 30 and the rear end portion of the side sill 2 below the rear portion in a substantially up-down direction of the vehicle. The structure body 36 also serves as a rear-side hinge pillar.

As illustrated in FIG. 1 and FIG. 2, an annular structure body LS that is annularly continuous in side view of the vehicle is formed by the roof side rail 21 that forms an upper wall portion having a closed cross-section structure, the front pillar portion 13 that forms an oblique wall portion having a closed cross-section structure, the hinge pillar portion 16 that forms a front wall portion having a closed cross-section structure, the side sill 2 that forms a lower wall portion having a closed cross-section structure, and the structure body 36 that forms a rear wall portion having a closed cross-section structure. A door opening portion 37 without a center pillar is formed on the side portion of the vehicle by the elements 21, 13, 16, 2, and 36. The door opening portion 37 is opened and closed as a front door and a rear door of a suicide door structure, for example. The front end of the front door of the suicide door structure is attached to the hinge pillar portion 16 via a front door hinge member so as to be openable and closable. The rear end of the rear door is attached to the structure body 36 via a rear door hinge member so as to be openable and closable.

As illustrated in FIG. 2, the structure body 36 is a vehicle body strength member extending in a substantially up-down direction of the vehicle on the rear portion of the door opening portion 37, and a front end pivotably supporting portion 40 of a trailing arm 39 in a torsion beam type rear suspension 38 serving as a rear suspension member of the vehicle is provided near the lower end portion of the structure body 36.

The front end pivotably supporting portion 40 of the trailing arm 39 is attached to an outer-side portion of the rear side frame 31 in the vehicle width direction via a support bracket. The trailing arm 39 in a torsion beam type rear suspension is exemplified as the rear suspension member in this embodiment, but the rear suspension member may be a suspension member in other types of rear suspensions.

As illustrated in FIG. 1 and FIG. 2, an opening of an opening portion 41 for a quarter window is formed in the rear side of the upper portion of the structure body 36. Substantially the entire side surface of the vehicle body including the abovementioned elements, that is, the structure body 36, the roof side rail 21, the rear pillar portion 24, the side panel inner portion 32, and the side sills 2 is covered with a body side outer panel 42 serving as a vehicle body outer plate except for the opening portion 41 and the door opening portion 37.

The roof reinforcement 28 that is the second reinforcement from the vehicle front side out of the plurality of roof reinforcements 27, 28, 29, and 30 illustrated in FIG. 3 has a cross sectional shape in the vehicle front-rear direction that forms a substantially W shape, e.g., a concave-convex shape. The substantially W-shaped roof reinforcement 28 will be discussed in detail with reference to FIG. 6 and FIG. 7.

In particular, a substantially W shape is obtained by integrally forming an upper wall 28a in an intermediate position in the vehicle front-rear direction, a pair of front and rear vertical walls 28b and 28c extending downward from both of front and rear ends of the upper wall 28a, a lower wall 28d extending frontward from a lower end of the vertical wall 28b on the front side, a lower wall 28e extending rearward from a lower end of the vertical wall 28c on the rear side, a protruding wall 28f extending upward from a front end of the lower wall 28d on the front side, a protruding wall 28g extending upward from a rear end of the lower wall 28e on the rear side, a flange portion 28h extending frontward from an upper end of the protruding wall 28f on the front side, and a flange portion 28i extending rearward from an upper end of the protruding wall 28g on the rear side.

In the roof reinforcement 28, the upper wall 28a and each of the front and rear flange portions 28h and 28i are at substantially the same height, and the front and rear lower walls 28d and 28e are also located at substantially the same height (see FIG. 6).

As illustrated in FIG. 5 and FIG. 7, in the roof reinforcement 28, tongue-shaped protruding portions 28j, 28j protruding outward in the vehicle width direction from both ends of the flange portion 28h on the front side in the vehicle width direction are integrally formed, and tongue-shaped protruding portions 28k, 28k protruding outward in the vehicle width direction from both ends of the flange portion 28i on the rear side in the vehicle width direction are also integrally formed. The roof reinforcement 28 is installed between the pair of left and right roof side rails 21, 21 in the vehicle width direction by fixing those protruding portions 28j and 28k to the roof side rails 21 by joining, e.g., by spot welding and the like.

As illustrated in FIG. 3, a reinforcement structure body 50 or brace is fixed to the roof reinforcement 28. As illustrated in FIG. 3, FIG. 4, and FIG. 7, the reinforcement structure body 50 has an integrated structure that includes a first inclined reinforcement member 51, a second inclined reinforcement member 52, a front wall portion 53, a rear wall portion 54, a left side wall portion 55, a right side wall portion 56, and a center wall portion 57 that define spaces 50s, e.g., triangular spaces. The first inclined reinforcement member 51 diagonally extends in the vehicle front-rear direction from a front portion on the right side in the vehicle width direction toward a rear portion on the left side in the vehicle width direction. The first inclined reinforcement member 51 is fixed to the upper wall 28a and the flange portions 28h and 28i of the roof reinforcement 28 at a position at which a front end portion 51a and a rear end portion 51b of the first inclined reinforcement member 51 in the vehicle front-rear direction offset each other in the vehicle width direction. The second inclined reinforcement member 52 intersects the first inclined reinforcement member 51 at a center of the reinforcement structure body 50. The second inclined reinforcement member 52 diagonally extends in the vehicle front-rear direction from a front portion on the left side in the vehicle width direction toward a rear portion on the right side in the vehicle width direction. The second inclined reinforcement member 52 is fixed to the upper wall 28a and the flange portions 28h and 28i of the roof reinforcement 28 at a position at which a front end portion 52a and a rear end portion 52b of the second inclined reinforcement member 52 in the vehicle front-rear direction offset each other in the vehicle width direction. The front wall portion 53 connects the front end portions 51a and 52a of the first and second inclined reinforcement members 51 and 52 to each other in the vehicle width direction. The rear wall portion 54 connects the rear end portions 51b and 52b of the first and second inclined reinforcement members 51 and 52 to each other in the vehicle width direction. The left side wall portion 55 connects the end portions 52a and 51b of the first and second inclined reinforcement members 51 and 52 on the vehicle left side to each other in the vehicle front-rear direction. The right side wall portion 56 connects the end portions 51a and 52b of the first and second inclined reinforcement members 51 and 52 on the vehicle right side to each other in the vehicle front-rear direction. The center wall portion 57 connects the front wall portion 53 and the rear wall portion 54 to each other in the vehicle front-rear direction via a cross portion of the inclined reinforcement members 51 and 52 in the center in the vehicle width direction. Both of the first inclined reinforcement member 51 and the second inclined reinforcement member 52 may be elongated members.

As illustrated in FIG. 4, in this embodiment, two reinforcement members, that is, the first inclined reinforcement member 51 and the second inclined reinforcement member 52 are elongated members that form a substantially X shape in plan view.

As described above, the twisting behavior of the roof reinforcement 28 that occurs when the vehicle travels is suppressed by joining the reinforcement member (at least one of the first inclined reinforcement member 51 and the second inclined reinforcement member 52) diagonally extending in the vehicle front-rear direction to the roof reinforcement 28.

In particular, when the door opening portion 37 does not have a center pillar, the structure body 36 extending in a substantially up-down direction of the vehicle is provided on the rear portion of the door opening portion 37, and the trailing arm 39 in the torsion beam type rear suspension 38 serving as the rear suspension member is pivotally supported near the lower end portion of the structure body 36 in order to dispose the front door and the rear door of the suicide door structure on a vehicle side portion. In this configuration, suspension load is input to the roof side rail 21 from the trailing arm 39 via the structure body 36, and the load is transmitted to the roof reinforcement 28. In particular, the roof reinforcement 28 tends to twist due to the sizes of the loads input to the left side and the right side of the roof reinforcement 28 in the vehicle width direction being different when the vehicle corners, but the inclined reinforcement members 51 and 52 suppress the twisting behavior.

The reinforcement structure body 50 formed by the elements 51 to 57 may be formed by punching a metal flat plate by a press apparatus, and a plurality of places of the portions at which the reinforcement structure body 50 corresponds to the upper wall 28a and the flange portions 28h and 28i of the roof reinforcement 28 are fixed to the roof reinforcement 28 by joining, e.g., spot welding and the like.

The length of the reinforcement structure body 50 in the vehicle width direction may be within a range of from 70% to 75% of the length of the roof reinforcement 28 in the vehicle width direction. The reinforcement structure body 50 may be fixed to the central portion of the roof reinforcement 28 in the vehicle width direction by joining. Note that the length and position are not limited to the abovementioned configuration. Further, the first inclined reinforcement member 51 and the second inclined reinforcement member 52 and may have different dimensions, e.g. length and width, or be at different positions along the roof reinforcement 26, e.g., may not be symmetric.

The first inclined reinforcement member 51 may have an inclined angle θ1 of from about 78 degrees to about 81 degrees with respect to the virtual centerline CL extending in the vehicle center in the vehicle front-rear direction in the clockwise direction in plan view.
Similarly, the second inclined reinforcement member 52 has an inclined angle θ2 of from about 78 degrees to about 81 degrees with respect to the virtual centerline CL extending in the vehicle center in the vehicle front-rear direction in the counterclockwise direction in plan view. The inclined angles are not limited to those numerical values. Further, the first inclined reinforcement member 51 and the second inclined reinforcement member 52 may be at different inclined angles from one another, e.g., may not be symmetric with respect to the virtual centerline CL.

In addition to the substantially X-shaped structure body obtained by combining the first inclined reinforcement member 51 and the second inclined reinforcement member 52 in a substantially X shape in plan view, the front wall portion 53, the rear wall portion 54, the left side wall portion 55, and the right side wall portion 56 may be integrally formed so that the reinforcement structure body 50 is easily loaded and the handleability thereof is improved when the reinforcement structure body 50 is transported.

As described above, the upper vehicle-body structure of the embodiment above includes: the pair of roof side rails 21 extending along the vehicle front-rear direction on both of left and right sides of the upper portion of the vehicle body in the vehicle width direction; the roof reinforcement 28 having a width in the vehicle front-rear direction and serving as a bridge between the pair of roof side rails 21, 21 in the vehicle width direction; and the reinforcement member (at least one reinforcement member out of the first inclined reinforcement member 51 and the second inclined reinforcement member 52) provided on the roof reinforcement 28 and diagonally extending in the vehicle front-rear direction, the reinforcement member being joined to the roof reinforcement 28 at the positions at which the front end portion and the rear end portion of the reinforcement member in the vehicle front-rear direction offset each other in the vehicle width direction (see FIG. 3, FIG. 4, and FIG. 7).

According to this configuration, the reinforcement member diagonally extending in the vehicle front-rear direction (at least one of the first inclined reinforcement member 51 and the second inclined reinforcement member 52) is joined to the roof reinforcement 28. Thus, the twisting behavior of the roof reinforcement 28 that occurs when the vehicle travels can be suppressed while saving weight.

In one embodiment, the reinforcement member (the first inclined reinforcement member 51 and the second inclined reinforcement member 52) are elongated members (see FIG. 4 and FIG. 7).

According to this configuration, by forming the reinforcement member (the first inclined reinforcement member 51 and the second inclined reinforcement member 52) by the elongated member, weight can be saved as compared to a structure in which the entire upper portion of the roof reinforcement 28 is covered with a solid rectangular plate.

In one embodiment, the reinforcement member (the first inclined reinforcement member 51 and the second inclined reinforcement member 52) may include a plurality of reinforcement members that cross or intersect, e.g., form a substantially X shape in plan view (see FIG. 4 and FIG. 7). Hence, the twisting prevention effect of the roof reinforcement 28 can be increased.

In one embodiment, the door opening portion 37 without a center pillar is formed in the vehicle side portion by each of the roof side rails 21 on which the roof reinforcement 28 is provided (see FIG. 1 and FIG. 2).

According to this configuration, the following advantageous effect is exhibited. When the door opening portion 37 does not have a center pillar, the twisting behavior easily occurs for the roof reinforcement 28 due to the absence of a center pillar. However, the twisting behavior of the roof reinforcement 28 can be suppressed by the reinforcement member (the first inclined reinforcement member 51 and/or the second inclined reinforcement member 52).

In one embodiment, the structure body 36 extending in a substantially up-down direction of the vehicle is provided on the rear portion of the door opening portion 37, and the rear suspension member (see the trailing arm 39 of the torsion beam type rear suspension 38) of the vehicle is provided near the lower end portion of the structure body 36 (see FIG. 2).

According to this configuration, the following advantageous effect is exhibited. The load is input from the rear suspension member (see the trailing arm 39) of the vehicle to the structure body 36 extending in a substantially up-down direction via a place near the lower end portion of the structure body 36, and the load is transmitted to the roof reinforcement 28 via the roof side rails 21. However, the twisting behavior of the roof reinforcement 28 can be suppressed by the reinforcement member (the first inclined reinforcement member 51 and/or the second inclined reinforcement member 52).

FIG. 8(a) to FIG. 8(d) are plan views illustrating reinforcement members of other embodiments. Therein, the right side of the figure is the vehicle front side and the left side of the figure is the vehicle rear side in each of FIG. 8A to FIG. 8D.

Figure 8:
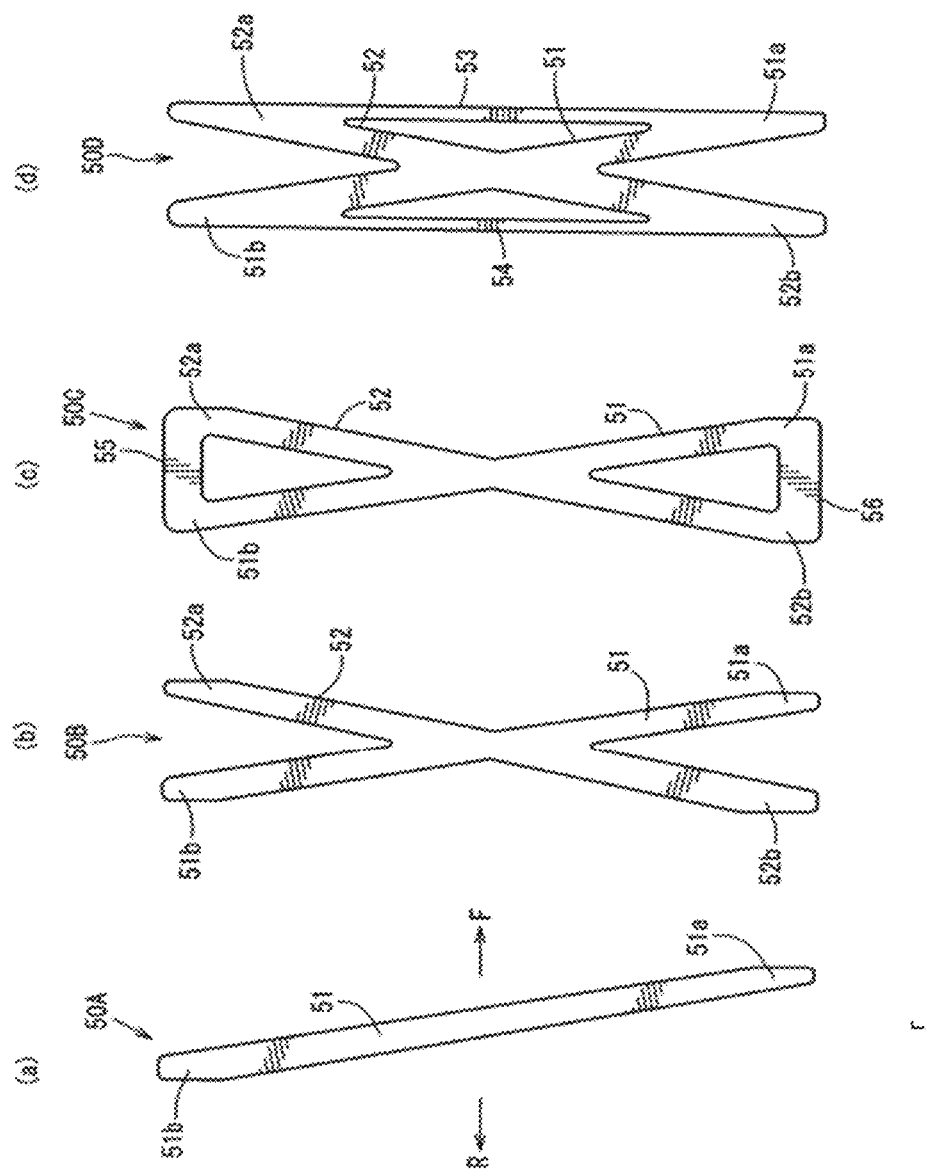
FIGS. 8(a) to (d) are plan views illustrating other embodiments of the reinforcement member.

A reinforcement structure body 50A illustrated in FIG. 8(*a*) uses only the first inclined reinforcement member 51. By this configuration, the twisting behavior of the roof reinforcement 28 can be suppressed while saving weight.

A reinforcement structure body 50B illustrated in FIG. 8(*b*) has a substantially X shape in plan view of the vehicle with use of the first inclined reinforcement member 51 and the second inclined reinforcement member 52. By this configuration, the twisting behavior of the roof reinforcement 28 can be further suppressed while still saving weight.

A reinforcement structure body 50C illustrated in FIG. 8(*c*) has a substantially X shape in plan view using the first inclined reinforcement member 51, the second inclined reinforcement member 52, the left side wall portion 55, and the right side wall portion 56, defining spaces therein. By this configuration, the twisting behavior of the roof reinforcement 28 can be suppressed even more while still saving weight, and the handleability thereof can be improved.

A reinforcement structure body 50D illustrated in FIG. 8(*d*) D has a structure portion having a substantially X shape in plan view with use of the first inclined reinforcement member 51, the second inclined reinforcement member 52, the front wall portion 53, and the rear wall portion 54, defining spaces therein. By this configuration, the twisting behavior of the roof reinforcement 28 can be further suppressed while still saving weight, and the handleability thereof can be improved.

Note that, in FIG. 8(*a*) to FIG. 8(*d*), the same parts as those in the previous figure are denoted by the same reference characters, and detailed description thereof is omitted.

Regarding the correspondence between the configuration and the abovementioned embodiments, the reinforcement member of embodiments corresponds to at least one reinforcement member out of the first inclined reinforcement member 51 and the second inclined reinforcement member 52 of the embodiments. Similarly, the rear suspension member of the vehicle corresponds to the trailing arm 39 of the torsion beam type rear suspension 38.

However, embodiments are not only limited to the above-mentioned configurations. For example, while the reinforcement member is described relative to the roof reinforcement 28 that is the second reinforcement from the vehicle front side, the structure may also be employed in other roof reinforcement members.

As described above, embodiments are useful for an upper vehicle-body structure in which a pair of roof side rails extending along the vehicle front-rear direction is provided on both of left and right sides of an upper portion of a vehicle body in the vehicle width direction, and a roof reinforcement having a width in the vehicle front-rear direction and serving as a bridge between the pair of roof side rails in the vehicle width direction is provided.

By way of summation and review, embodiments provide an upper vehicle-body structure capable of suppressing the twisting behavior of a roof reinforcement that occurs when a vehicle travels while saving weight

REFERENCE SIGNS LIST

21 Roof side rail
28 Roof reinforcement
36 Structure body
37 Door opening portion
39 Trailing arm (rear suspension member)
51 First inclined reinforcement member (reinforcement member)
51*a*, 52*a* Front end portions
51*b*, 52*b* Rear end portions
52 Second inclined reinforcement member (reinforcement member)

What is claimed is:

1. An upper vehicle-body structure, comprising:
    a pair of roof side rails extending along a vehicle front-rear direction on both of left and right sides of an upper portion of a vehicle body in a vehicle width direction;
    a roof reinforcement having a width in a vehicle front-rear direction, the roof reinforcement to serve a bridge between a pair of roof side rails in a vehicle width direction; and
    a brace provided on the roof reinforcement and diagonally extending in the vehicle front-rear direction, the brace being joined to the roof reinforcement at positions at which a front end portion and a rear end portion of the brace in the vehicle front-rear direction are offset from each other in the vehicle width direction,
    wherein the brace is a metal flat plate fixed to the roof reinforcement.

2. The upper vehicle-body structure according to claim 1, wherein the brace is elongated.

3. The upper vehicle-body structure according to claim 2, wherein:
    the brace includes a plurality of reinforcement members; and
    the plurality of reinforcement members form a substantially X shape in plan view.

4. The upper vehicle-body structure according to claim 3, wherein a door opening portion without a center pillar is in a vehicle side portion by each of the roof side rails on which the roof reinforcement is provided.

5. The upper vehicle-body structure according to claim 4, wherein:
    a structure body extending in a substantially up-down direction of a vehicle is provided on a rear portion of the door opening portion; and
    a rear suspension member of the vehicle is provided near a lower end portion of the structure body.

6. The upper vehicle-body structure according to claim 2, wherein a door opening portion without a center pillar is in a vehicle side portion by each of the roof side rails on which the roof reinforcement is provided.

7. The upper vehicle-body structure according to claim 6, wherein:
    a structure body extending in a substantially up-down direction of a vehicle is provided on a rear portion of the door opening portion; and
    a rear suspension of the vehicle is provided near a lower end portion of the structure body.

8. The upper vehicle-body structure according to claim 1, wherein the brace includes two elongated members that intersect.

9. The upper vehicle-body structure according to claim 8, wherein at least one of the front end portion and the rear end portion of the two elongated members are connected along the front-rear direction.

10. The upper vehicle-body structure according to claim 9, wherein at least one of the front end portions and the rear end portions of the two elongated members are connected along the vehicle width direction.

11. The upper vehicle-body structure according to claim 8, wherein at least one of the front end portions and the rear end portions of the two elongated members are connected along the vehicle width direction.

12. The upper vehicle-body structure according to claim 8, wherein the two elongated members are symmetric about the vehicle width direction.

13. The upper vehicle-body structure according to claim 8, wherein the two elongated members are integrated.

14. The upper vehicle-body structure according to claim 8, wherein the two elongated members are connected at a portion other than where they intersect, forming a space in the brace.

15. The upper vehicle-body structure according to claim 1, wherein the front end portion and the rear end portion of the brace are offset by the width of the roof reinforcement.

16. The upper vehicle-body structure according to claim 1, wherein the roof reinforcement has a concave-convex shape.

17. The upper vehicle-body structure according to claim 1, wherein brace is fixed to a central portion of the roof reinforcement in the vehicle width direction.

18. The upper vehicle-body structure according to claim 3, wherein the brace further includes a left side wall portion that connects end portions of the substantially X shape on a left side of the vehicle width direction in the vehicle front-rear direction and a right side wall portion that connects end portions of the substantially X shape on a right side of the vehicle width direction in the vehicle front-rear direction.

19. The upper vehicle-body structure according to claim 3, wherein the brace further includes a front wall portion that connects front end portions of the substantially X shape in the vehicle width direction, a rear wall portion that connects rear end portions of the substantially X shape in the vehicle width direction, and a center wall portion that connects the front wall portion and the rear wall portion along the vehicle front-rear direction at an intersection of the substantially X shape.

* * * * *